Figure 1:
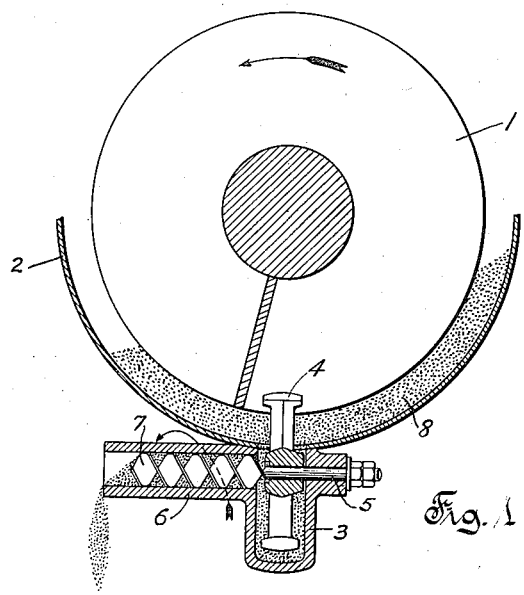

R. C. NEWHOUSE.
SAMPLING DEVICE.
APPLICATION FILED AUG. 1, 1914.

1,170,842.

Patented Feb. 8, 1916.

UNITED STATES PATENT OFFICE.

RAY C. NEWHOUSE, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

SAMPLING DEVICE.

1,170,842.  Specification of Letters Patent.  Patented Feb. 8, 1916.

Application filed August 1, 1914. Serial No. 854,889.

*To all whom it may concern:*

Be it known that I, RAY C. NEWHOUSE, a citizen of the United States, residing at Milwaukee, in the county of Milwaukee and State of Wisconsin, have invented a certain new and useful Improvement in Sampling Devices, of which the following is a specification.

This invention relates to improvements in the construction of sampling devices and is especially applicable to devices for automatically removing samples of material which is being transported by means of a helical or screw conveyer.

An object of the invention is to provide a sampling device which is simple in construction and efficient in operation.

One of the more specific objects is to provide a device especially applicable for use in connection with helical or screw conveyers, which will automatically remove samples of the material being transported, at regular intervals.

Another object is to provide a device which may be applied to any standard screw conveyer and which will operate entirely automatically.

A further object is to provide a device which will deliver fair samples of the material.

A clear conception of an embodiment of the invention may be had by referring to the drawing accompanying and forming a part of this specification in which like reference characters designate the same parts in the various views.

Figure 2:
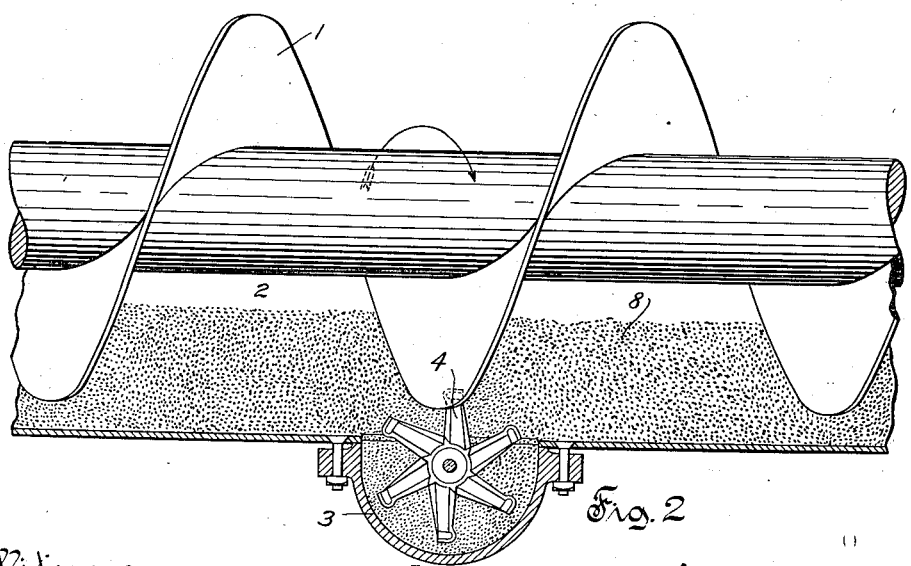

Figure 1 is a transverse vertical section through a screw conveyer, a fragment of the conveyer trough and a sampling device. Fig. 2 is a central vertical section through a fragment of a conveyer trough and through a sampling device.

The screw conveyer 1, which is of the usual type consisting of one or more helical blades formed upon a central conveyer shaft, is mounted within the conduit or conveyer trough 2, being adapted to rotate in an anticlockwise direction as indicated by the arrow in Fig. 1, to transport material 8 along the trough. As shown in the drawing, the conveyer 1 is urging finely ground material 8 through the trough 2 from left to right as viewed in Fig. 2. While the material 8 is indicated as filling only the lower portion of the trough 2, it should be understood that this material may at some times entirely fill the trough.

The trough 2 has an elongated opening in the bottom thereof at a point directly above the star wheel pocket formed in the sampler casing 3. The fastening of the casing 3 to the trough 2 is accomplished by any suitable means such as stove bolts. The casing 3 is provided at one side with a lug and at the opposite side with a discharge spout 6 which extends transversely of the trough 2. The sampler shaft 5 is mounted within a bearing in the lug formed on the side of the casing 3 and has an auger or sample discharge conveyer 7 secured to one end thereof and disposed to rotate within the discharge spout 6.

The star wheel 8 is secured to the sampler shaft 5 at a portion thereof directly adjacent its bearing in the casing 3 and has substantially radial arms, the outer extremities of which lie in a circle which extends into the path of the screw conveyer 1. Between the hub of the star wheel 4 and the end of the bore of the spout 6, there exists an opening or passage which connects the interior of the casing 3 directly with the interior of the trough 2.

During the normal operation of the conveyer 1, the helical flange or blade of the conveyer is rotated in an anticlockwise direction as viewed in Fig. 1, causing the continuous conveyer blade to constantly urge the material 8 along the trough 2. As the conveyer blade approaches the upwardly directed arms of the star wheel 4, it engages one of the star wheel arms and causes the star wheel 4 to produce partial rotation of the shaft 5 and secondary or sample conveyer 7, this rotation continuing until the engaged arm has been pushed out of the path of the conveyer blade. When the star wheel arm which has been forced forward by the conveyer blade, has been pushed out of the path of the blade, the next succeeding arm of the star wheel will have been placed in the path of the conveyer and will be ready for subsequent engagement with the same. It will thus be seen that as the conveyer 1 continues to rotate, the star wheel 4 is intermittently rotated in a clockwise direction as viewed in Fig. 2. This rotation of the star wheel 4 causes the auger or conveyer 7 which is connected thereto, to automatically force some of the material 8 which fills the interior of the casing 3, into the spout 6. After the spout 6 has become filled with material, the continued intermittent rotation of the star wheel 4 causes intermittent discharges of samples of the material from the end of the spout.

It will be noted that the sampling device consisting of the casing 3, star wheel 4 and conveyer 7, may be applied to, and will operate successfully with, any standard helical or screw conveyer, so long as the star wheel arms are made of sufficient length and are properly spaced to permit successive engagement thereof with the continuously rotating conveyer blade. The operation of the device is moreover entirely automatic and when once installed the sampler requires no further attention.

It should be understood that it is not desired to be limited to the exact details of construction shown and described, for obvious modifications will occur to a person skilled in the art.

It is claimed and desired to secure by Letters Patent,—

1. In combination, a main casing forming a conduit, a main screw conveyer movable to transport material through said conduit, a sampler casing communicating with said main casing conduit, and an auxiliary screw conveyer operable by said main conveyer to intermittently deliver samples of material from said sampler casing.

2. In combination, a main casing forming a conduit, a screw conveyer having a blade movable to transport material through said conduit, a sampler casing forming a conduit communicating with said main casing conduit, and means operable directly by the moving blade of said conveyer to intermittently deliver samples of material from said sampler casing conduit.

3. In combination, a main casing forming a conduit and having an opening through the bottom thereof, a screw conveyer movable to transport material through said conduit and over said opening, a sampler casing forming a conduit communicating with said main casing conduit at said opening, and means directly operable by a portion of said conveyer adjacent said opening for intermittently removing samples of material from said sampler casing conduit.

4. In combination, a trough, a screw conveyer having a rotatable blade adapted to transport material through said trough, a star wheel having arms engageable with the blade of said conveyer, said star wheel being rotatable by the rotation of said conveyer blade, and a secondary conveyer rotatable by the movement of said star wheel to remove from said trough samples of the material being transported.

In testimony whereof, the signature of the inventor is affixed hereto in the presence of two witnesses.

RAY C. NEWHOUSE.

Witnesses:
  W. H. LIEBER,
  J. J. KANE.